United States Patent [19]
LeFever et al.

[11] 3,941,969
[45] Mar. 2, 1976

[54] APPARATUS AND PROCESS FOR APPLYING CONTACT DOTS

[75] Inventors: Stanton Brenneman LeFever, Lancaster; Robert Michael Matrisian, New Cumberland, both of Pa.

[73] Assignee: E. I. Du Pont de Nemours and Co., Wilmington, Del.

[22] Filed: Aug. 9, 1973

[21] Appl. No.: 387,033

[52] U.S. Cl. .................... 219/68; 29/628; 29/630 C; 219/85
[51] Int. Cl.² ........................................ B23K 11/22
[58] Field of Search .. 29/628, 630 B, 630 C, 630 R; 219/68, 85 CA, 85 D, 85 F, 137

[56] References Cited
UNITED STATES PATENTS

| | | | |
|---|---|---|---|
| 2,679,570 | 5/1954 | Cisne | 219/68 |
| 3,401,723 | 9/1968 | Petry | 219/68 X |
| 3,650,026 | 3/1972 | Freeman | 29/630 C |
| 3,672,047 | 6/1972 | Sakamoto et al. | 29/628 |
| 3,686,457 | 8/1972 | Dubac et al. | 29/630 C X |

*Primary Examiner*—C. L. Albritton
*Assistant Examiner*—N. D. Herkamp

[57] ABSTRACT

A process and apparatus are provided for applying gold contacts to a metal member by engaging the end of a hard gold wire with the metal member, welding the end of the wire to the member, heating the gold wire to establish a difference in its temper along a boundary in the region of the weld, and breaking away the gold wire along the boundary in the region of the weld. The apparatus comprises a first welding electrode having opposing jaws for receiving a gold wire, the jaws are actuatibly disposed on a yoke member which is pivotally mounted in an opposing relationship with a second welding electrode. The jaws clamp the wire and urge its end against the metal member during electrical welding of the wire end to the member. The opposing jaws are then released and retracted a first distance along the gold wire and then reclamp the wire. The yoke completes its pivotal travel pulling on the wire. The wire is deformed along the temper boundary in the region of the weld and then broken. The welded gold contact may then be coined to provide a contact of desired configuration.

9 Claims, 8 Drawing Figures

APPARATUS AND PROCESS FOR APPLYING CONTACT DOTS

BACKGROUND OF THE INVENTION

1. Field of the Invention

This invention relates to the fabrication of contacts for use with electrical circuits, and particularly relates to attaching an electrical contact to a metal member, suitable for fabricating electrical sockets or terminals.

2. Description of the Prior Art

Female sockets for receiving male terminals are well-known in the prior art. The general requirements for such sockets is that they have interior surfaces for establishing electrical contact with a male terminal. It is well-known to gold plate the interior surface of a female socket and the outer surface of the male terminal to insure that they remain engaged and provide good electrical contact. The gold plating process of the prior art is both expensive and inefficient. Whether the strip material from which the female sockets are to be fabricated is coated on one or both sides the amount of gold applied to the surface is greater than is actually required for establishing good electrical contact with the male terminal. In an effort to decrease the amount of gold used and insure good electrical contact with the male socket terminal, the female sockets have been fabricated from base metal strips having a small raised gold contact or dot welded on what is to become the interior surface of the female socket. Although this latter type of socket provides for substantial economy in the amount of gold required for providing good electrical contact with the male terminal, it requires either substantial manual processing operations or complex and expensive automatic equipment.

SUMMARY OF THE INVENTION

According to the present invention there is provided a process for attaching a tarnish-resistant metal contact on a metal member comprising the steps of engaging an end of a metal element with the metal member, welding the metal element to said metal member, heating the metal element to establish a difference in temper along a boundary within the element in the region of the weld, and pulling the element from the member to break the element away from the member along the boundary within the element in the region of the weld leaving the end of the element attached to the member to provide a tarnish-resistant contact on the member.

The invention also provides an apparatus for attaching a tarnish-resistant contact to a metal member, comprising, feed means for engaging a metal element with a metal member, means for welding said metal element to said metal member and establishing a difference in the temper within the element along a boundary in the region of the weld, and means for pulling the element and braking it away from the member along the boundary in the region of said weld leaving the end of the element attached to the member to produce a tarnish-resistant contact on the member.

Optionally means may be provided for coining the tarnish-resistant contact subsequent to breaking away the end of the element from the member.

The process and apparatus of the invention provide for reliably attaching a contact to a metal member from which female sockets may then be fabricated by conventional techniques well known in prior art. The process and apparatus of the invention provide for substantial economy by eliminating waste and minimizing the amount of contact material, e.g., gold, required to provide an electrical contact. Further expensive manual operations or complex automatic apparatus presently required for preparing contacts are not required.

DETAILED DESCRIPTION OF THE INVENTION

The apparatus and process of the invention are described with reference to the attached drawings wherein the same numerals are used throughout the figures to identify the same elements.

Figure 1:
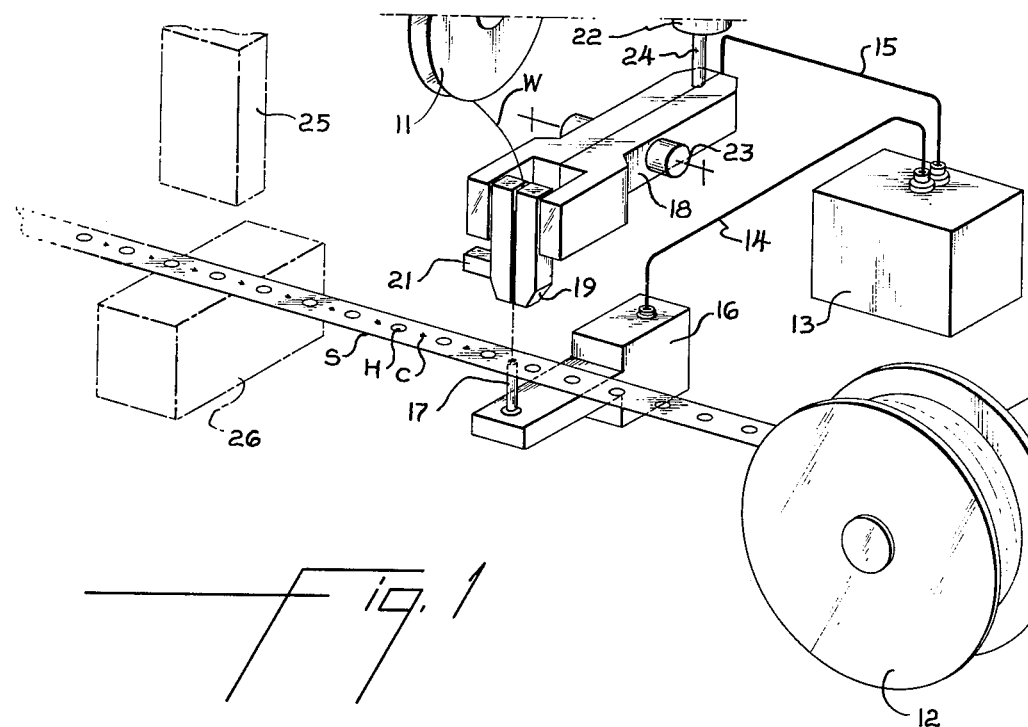
FIG. 1 is a perspective schematic drawing of a preferred embodiment of an apparatus of the invention.
Figure 2:
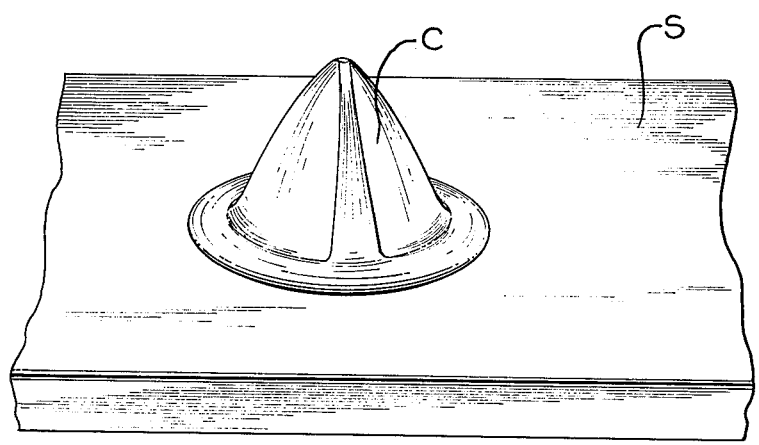
FIg. 2 is a perspective drawing of a contact surface attached to a metal member illustrating a contact prepared according to the invention.
Figure 3:
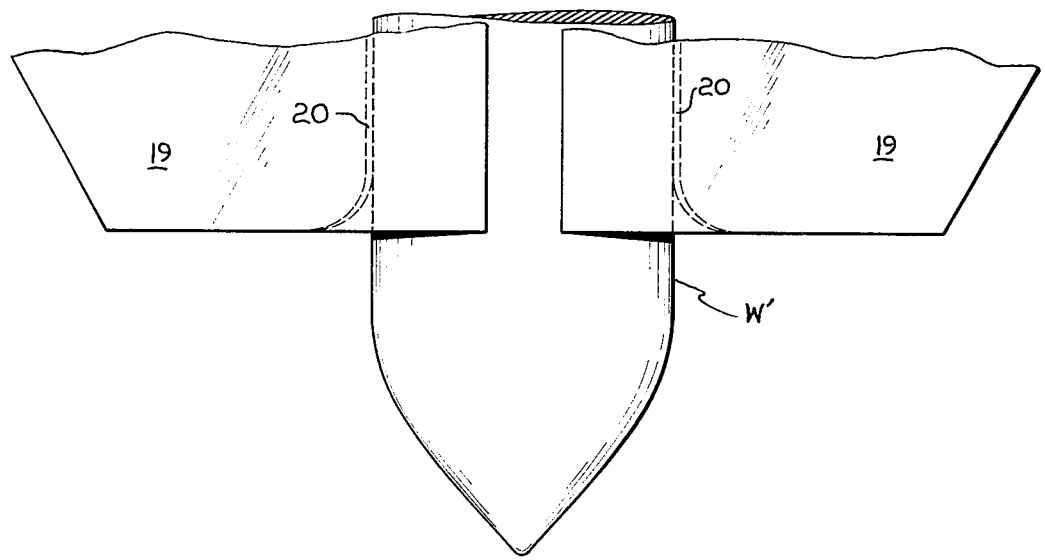
FIGS. 3–8 illustrate in detail the sequence of operation of the process and apparatus of the invention.
Figure 3:
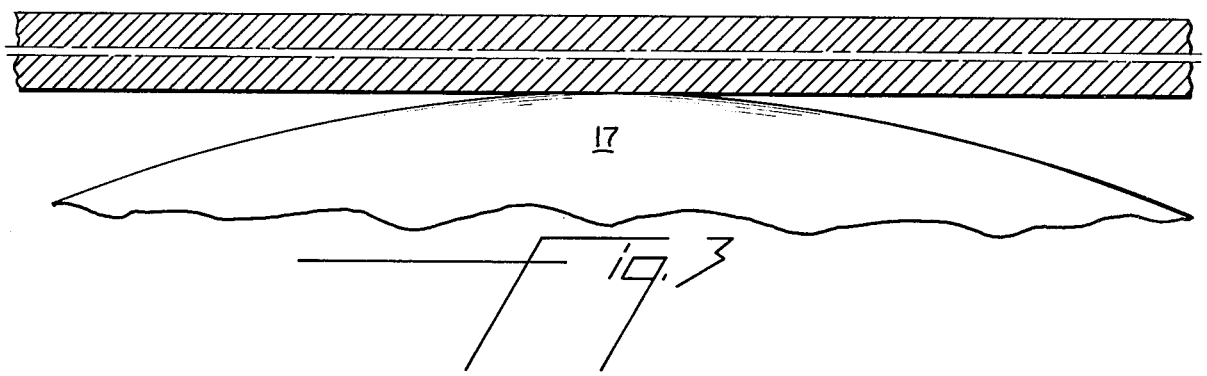

The apparatus of the invention comprises a first welding electrode 19 having opposing jaws with recesses 20 therein. The opposing jaws are actuatibly disposed on yoke member 18. A clamp mechanism 21 opens and closes the opposing jaws of welding electrode 19. The yoke member 18 is in turn pivotally disposed through trunnions 23 on fixed members on a housing provided for the apparatus, neither of which are illustrated. The yoke member 18 is connected through shaft 24 to air cylinder 22 which is mounted to a housing for the apparatus, not shown in the schematic representation of FIG. 1. A second welding electrode 17 is disposed below the first electrode 19 on fixed member 16 on a base of the housing provided for the apparatus but not shown. Welding electrodes 19 and 17 are respectively connected through wires 15 and 14 to an electric welding source 13. A wire element W, preferably a hard gold wire, is supplied to electrode 19 from feed reel 11. Strip member S is conveyed over the tip of welding electrode 17 from supply reel 12. Additionally, a coining member 25 and an anvil 26 may be provided. A take-up roll and guide means (not shown) may be provided for advancing and indexing the strip S in descrete increments between the welding electrodes 19 and 17 and optional coining member 25 and anvil 26. Additionally, cooling means may be provided to the opposing jaws for increasing the heat sink capacity of the opposing jaws.

Figure 4:
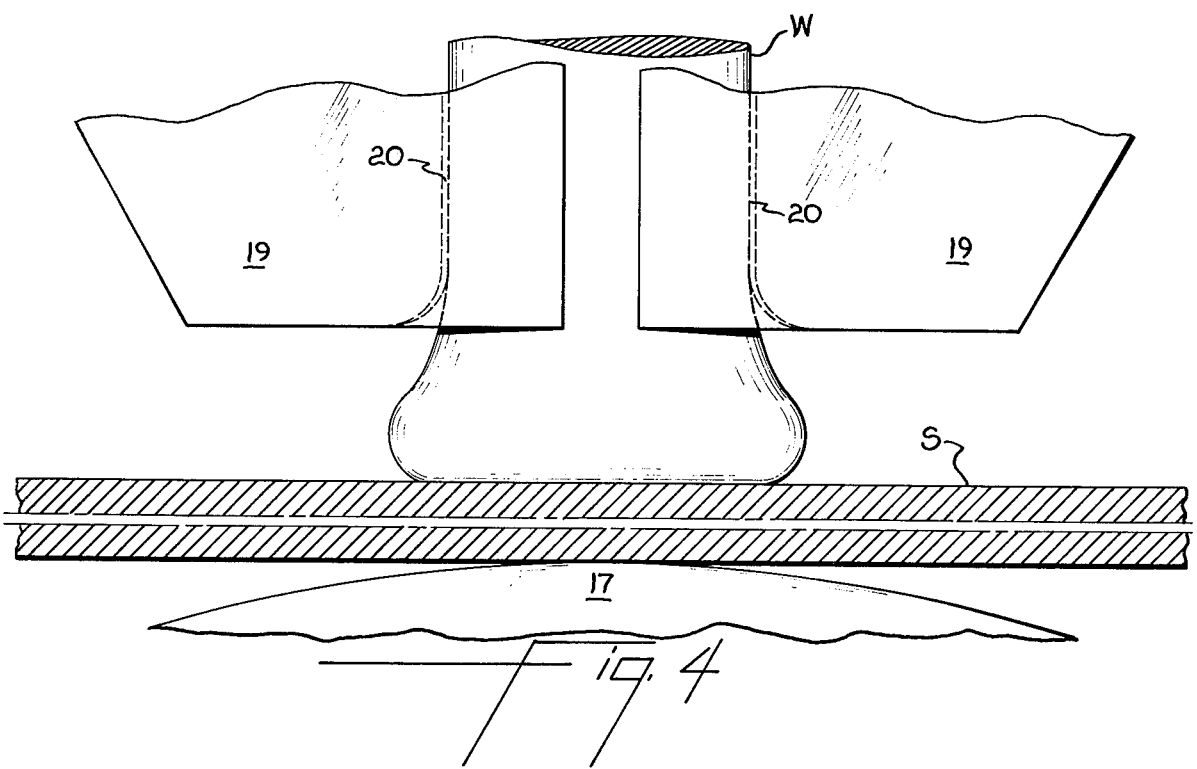
Figure 5:
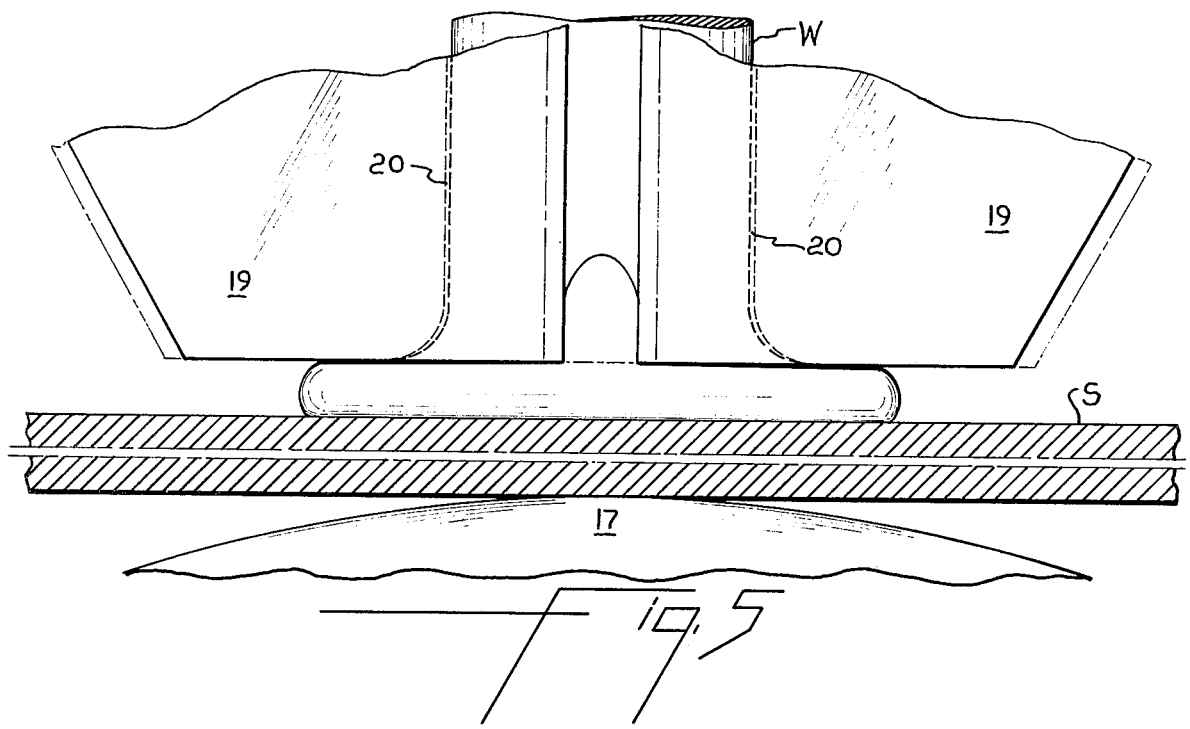
Figure 6:
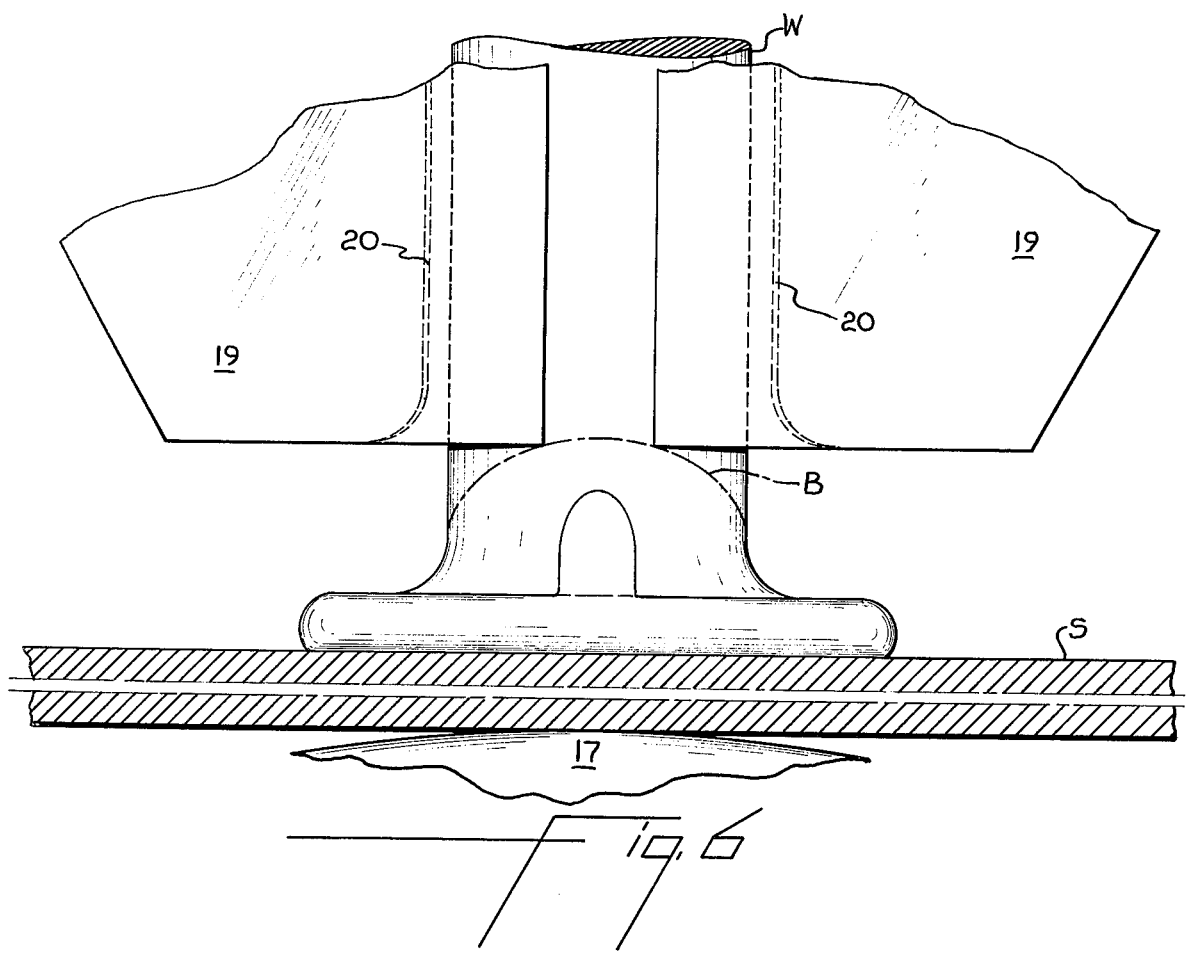
Figures 7, 8:
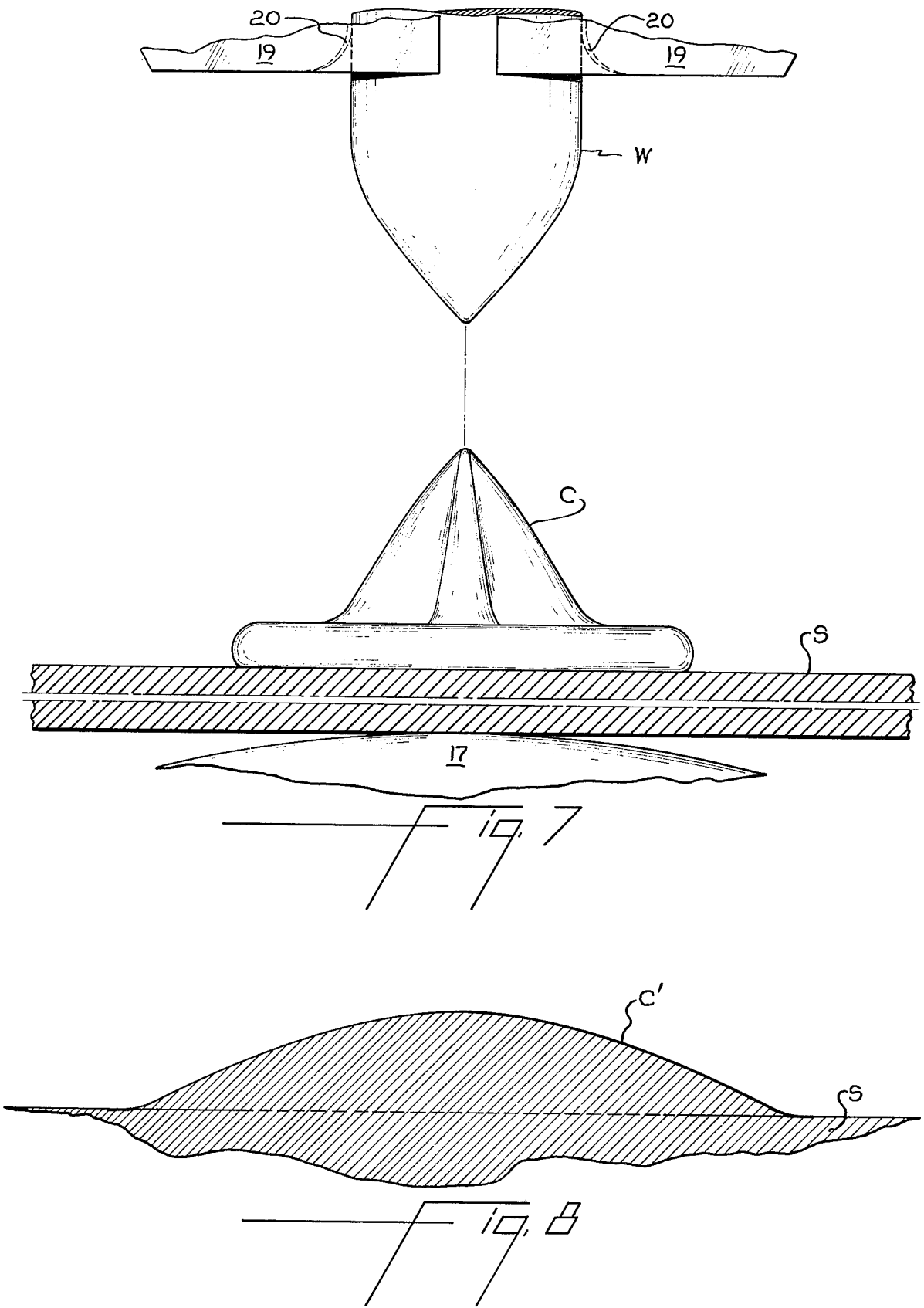

The operation of the apparatus and process may be readily understood with reference to the drawings and particularly FIGS. 3–7. The element from which the contact is to be formed, preferably a hard gold wire, is threaded through recesses 20 in opposing jaws 19 of the first welding electrode until an end extends therefrom. The operation of the apparatus is then initiated and the opposing jaws 19 are closed by clamp 21. Air cylinder 22 is activated and shaft 24 pivots yoke and electrode 19 downward engaging the end of the element W into contact with the strip S. Strip S is firmly urged against the second electrode 17. The end mushrooms as illustrated in FIG. 4. As the electrode continues downward the mushroomed tip is flattened as illustrated in FIG. 5 and welded to the strip S. The jaws of electrode 19 are opened by clamp 21 and the wire element is released. The electrode 19 is withdrawn in two steps. The first step illustrated in FIG. 6 with the opposing jaws released shows the jaws withdrawn a distance approximately the length of the temper boundary B established by heating during the welding and the removal of the heat from the element within the opposing jaws which act as a heat sink. Clamp 21 is reactivated closing opposing jaws of the first welding electrode 19. In the second step shaft 24 pivotally withdraws the yoke 18 the remainder of its travel and opposing jaws disposed thereon pull the element. The pulling of element W causes deformation along the temper boundary B shown in FIG. 6 until the element breaks away along the deformed temper boundary leaving the end of the element welded to the strip and producing the contact C attached to the strip S. The temper boundary as described and illustrated is not intended to be limiting, but merely descriptive of the region within the element contiguous to the weld where the heat generated by passing an electrical current through the element to make the weld causes tempering of the hard gold wire. The boundary may be irregularly shaped and its shape interface is not critical. The element is preferably annealed at the weld, and a difference in the temper within the element is established in the region contiguous to the end welded to the member and the hard gold wire within the opposing jaws of electrode 19 which act as a heat sink and prevent change of the temper of the wire element within the jaws. Then when the unwelded portion of the element is pulled that portion will tensile break from the end of the element welded to the member. Generally this break will be preceded by deformation of the element along the temper boundary. The contact C may then be coined to produce a smooth uniform surface as illustrated by C in FIG. 8.

In the preferred embodiment of the invention the element W is preferably a hard gold wire which on heating becomes annealed or tempered in the region of the weld below boundary B and remains hard above B due to the action of the jaws as a heat sink. The strip member S may be any conventional metal suitable for fabricating female sockets or other electrical contact members. However, the particular materials useful in the process of the invention are not so limited. For example, any metal element, wherein a difference in the temper in a region within the element can be established contigious to the weld, and which deforms along the temper boundary when pulled from the member to which it is welded, may be used. Similarly, the process is not limited to the preparation of contacts for female sockets, or electrical terminals, but may be used for attaching metal elements on metal members for other purposes, with or without the subsequent coining step. In view of variations, equivalents and modifications of the invention which will be obvious to others skilled in the art, the invention is not intended to be limited except by the appended claims.

We claim:

1. A process for attaching a metal element to metal member, comprising the steps of:
   engaging an end portion of said metal element with said metal member,
   welding said end portion to said metal member by passing an electrical current through said element and said member thereby heating said element and removing the heat from said element thereby establishing a difference in temper along a boundary within said element contiguous to the region of said weld, and
   pulling said element to break it away from said member in the region of said weld along said boundary leaving said end portion of said element attached to said member.

2. A process according to claim 1 wherein said metal element is a continuous hard gold wire.

3. The process according to claim 1 additionally including the step of coining the end portion of said element attached to said member.

4. A process for preparing a contact on a metal member, comprising the steps of:
   engaging an end portion of a metal element with a metal member,
   welding said end portion to said member by passing an electrical current through said element and said metal member thereby heating said element and removing the heat from said element thereby establishing a difference in temper of said element along a boundary within said element continguous to the region of said weld, and
   pulling said element from said member to break it away from said member in the region of said weld along said boundary leaving said end portion of the form of a contact attached to said member.

5. A process according to claim 4 wherein said element is a hard gold wire.

6. A process according to claim 4 additionally comprising coining said end portion of the element welded to the member to provide a substantially uniform contact.

7. An apparatus for attaching an end portion of a metal element to a metal member comprising
   feed means for engaging said end portion of said metal element with said strip member,
   means for welding said end portion of said metal element to said member including a heat sink for establishing a difference in temper along a boundary within said element contiguous to the region of said weld, and
   means for pulling said element to break it away from said member along said boundary in the region of the weld leaving said end portion as a contact attached to said member.

8. An apparatus according to claim 7 wherein said means for welding said metal element comprises a first welding electrode having opposing jaw members actuatibly disposed for clamping said element, and a second welding electrode disposed in an opposing relationship with said first welding electrode.

9. An apparatus according to claim 8 additionally including means for coining said contact to provide a substantially uniform contact.

* * * * *